US010902872B1

United States Patent
Hasegawa et al.

(10) Patent No.: US 10,902,872 B1
(45) Date of Patent: Jan. 26, 2021

(54) MANAGING INDEX WRITES TO A TAPE MEDIUM

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Shinsuke Mitsuma, Machida (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/669,773

(22) Filed: Oct. 31, 2019

(51) Int. Cl.
*G11B 5/584* (2006.01)
*G11B 5/55* (2006.01)
*G11B 15/68* (2006.01)
*G06F 3/06* (2006.01)
*G11B 5/008* (2006.01)

(52) U.S. Cl.
CPC .......... *G11B 5/5517* (2013.01); *G06F 3/0604* (2013.01); *G06F 3/0634* (2013.01); *G06F 3/0682* (2013.01); *G11B 5/00813* (2013.01); *G11B 5/5508* (2013.01); *G11B 15/6885* (2013.01)

(58) Field of Classification Search
None
See application file for complete search history.

(56) References Cited

U.S. PATENT DOCUMENTS

| | | | | |
|---|---|---|---|---|
| 8,484,412 | B2 * | 7/2013 | Bates | G11B 15/026 360/69 |
| 8,817,411 | B1 * | 8/2014 | Sims | G11B 27/002 360/72.1 |
| 8,908,314 | B2 * | 12/2014 | McCallister | G11B 15/32 360/73.05 |
| 8,954,663 | B1 * | 2/2015 | Klein | G06F 16/113 711/111 |
| 9,063,666 | B2 * | 6/2015 | Amir | G06F 3/0611 |
| 9,128,619 | B2 | 9/2015 | Sims et al. | |
| 9,430,155 | B2 * | 8/2016 | Amir | G06F 3/0686 |
| 9,431,054 | B1 * | 8/2016 | Goker | G06F 11/1076 |
| 9,606,740 | B2 | 3/2017 | Klein et al. | |
| 10,204,653 | B2 * | 2/2019 | Hasegawa | G11B 15/1883 |
| 10,229,718 | B1 * | 3/2019 | Hasegawa | G11B 27/107 |
| 10,453,485 | B1 * | 10/2019 | Miyamura | G06F 3/0682 |
| 10,572,170 | B2 * | 2/2020 | Abe | G06F 3/0604 |

(Continued)

*Primary Examiner* — Tan X Dinh
(74) *Attorney, Agent, or Firm* — James L. Olsen

(57) ABSTRACT

Aspects of the present disclosure relate to managing index writes within a tape. A determination can be made that a change was made to at least one file stored within a tape medium while the tape medium was mounted within a tape drive. In response to the determination, an index can be written to a data partition of the tape medium. A determination can be made whether the change included any changes to a file at least equal to a threshold hierarchy level. In response to determining that the change did not include any changes to a file at least equal to the threshold hierarchy level, a first instruction can be issued to the tape drive to reposition the tape medium to the end of the tape. A second instruction can be issued to the tape drive to perform an unthread operation at low tension to rewind the tape medium.

20 Claims, 7 Drawing Sheets

(56) References Cited

U.S. PATENT DOCUMENTS

2019/0180778 A1*   6/2019  Abe .................... G06F 16/1727
2019/0187913 A1*   6/2019  Hasegawa ............. G06F 3/0634
2019/0228080 A1*   7/2019  Abe ........................ G06F 3/065
2019/0310942 A1*  10/2019  Yamamoto ........... G11B 27/107

* cited by examiner

MANAGING INDEX WRITES TO A TAPE MEDIUM

BACKGROUND

The present disclosure relates generally to the field of storage, and more particularly to writing data in a tape file system.

Magnetic tape systems store digital information on a magnetic tape. The magnetic tape can include a ferromagnetic material that, when exposed to a magnetic field, is magnetized. Tape systems use "tape heads" to apply magnetic flux to the ferromagnetic material of the tape medium to write data to the tape. Based on the stored magnetic imprint on the tape, binary data can be generated and read from the tape.

SUMMARY

Aspects of the present disclosure relate to a method, system, and computer program product for managing index writes to a tape medium. A determination can be made whether a change was made to at least one file stored within a tape medium while the tape medium was mounted within a tape drive. In response to determining that the change was made to at least one file while the tape medium was mounted within the tape drive, an index can be written to a data partition of the tape medium. A determination can be made whether the change included any changes to a file at least equal to a threshold hierarchy level. In response to determining that the change did not include any changes to a file at least equal to the threshold hierarchy level, a first instruction can be issued to the tape drive to reposition the tape medium to the end of the tape. A second instruction can be issued to the tape drive to perform an unthread operation at low tension to rewind the tape medium.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
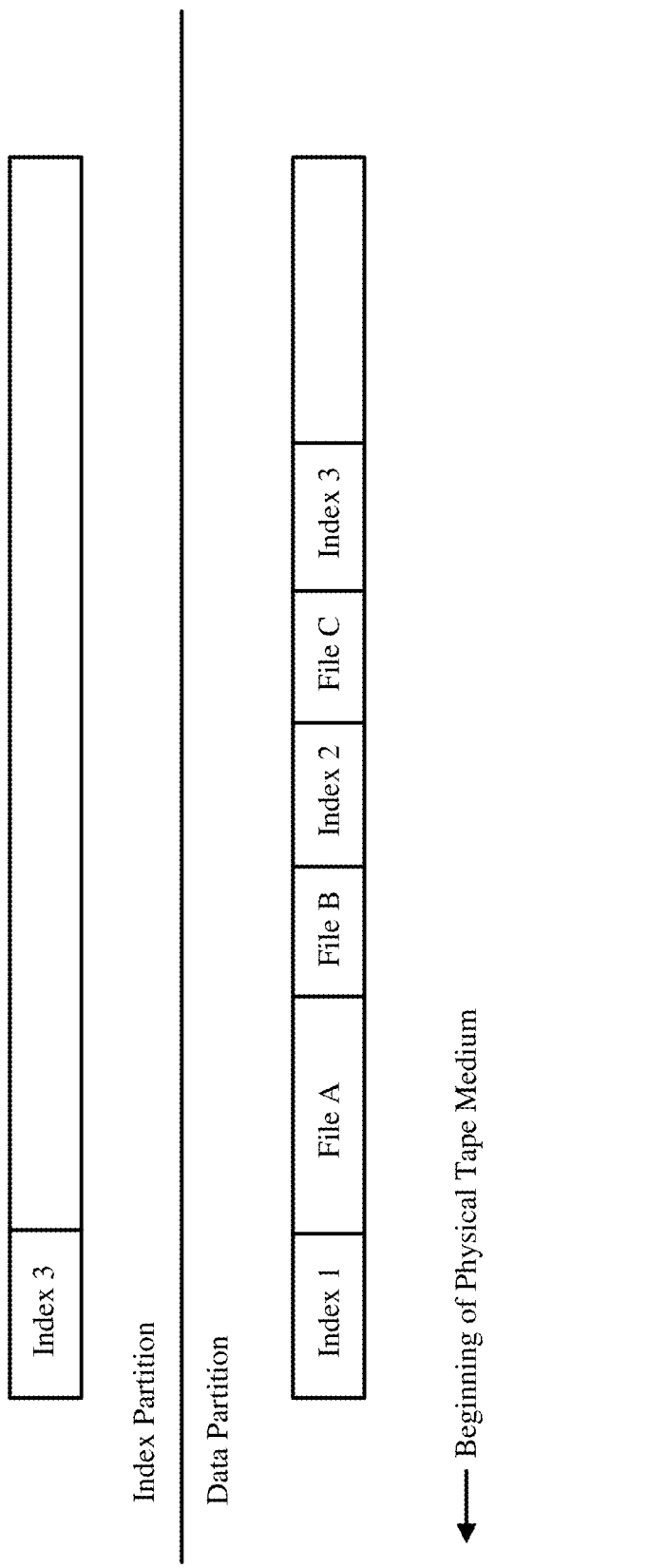
FIG. 1 is a diagram illustrating an example tape medium format including an index partition (IP) and data partition (DP), in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of storage, and more particularly to writing data in a tape file system. While the present disclosure is not necessarily limited to such applications, various aspects of the disclosure may be appreciated through a discussion of various examples using this context.

The Linear Tape File System (LTFS) is a file system that allows access to files stored on a tape medium in a similar fashion to files stored on a disk (e.g., Hard Disk Drive (HDD)) or flash memory (e.g., a NAND Storage USB Memory Device). The LTFS enables data access (e.g., read/write access) to a file stored on the tape medium directly from a file-based application without using a dedicated application for the tape drive. The LTFS is formatted in accordance with an open specification defined by the International Organization for Standardization (ISO). The ISO defined LTFS format specification includes two partitions: an index partition (IP) and a data partition (DP). The index partition records indices (e.g., metadata or index information) for respective files and the data partition records the files as well as indices.

The index partition is updated with the most recent index information to reduce the amount of time required to read index information when the tape medium is mounted into a tape drive. Upon remounting the tape medium, the index information is read from the index partition (e.g., located at the beginning of the tape medium) and the most recent data written to the tape medium can be located on the tape medium. In contrast, the index information can also be read directly from the data partition, though the mounting process can take more time, as the index stored on the data partition is located at the end of the data portion of the tape. Index information can be updated to the index partition and/or data partition each time a file is closed, when the tape is unmounted, and/or periodically (e.g., every 5 minutes).

As tape recording density increases over time, the tension at which tapes are wound also increases to reduce the amount of time required to reposition the tape media. Under increased tension, tape media can become unreadable due to physical stretching caused by tape drives. To avoid this problem, an operational mode called Archive Mode Unthread is offered for tape drives. When Archive Mode Unthread is enabled, the tape drive rewinds the tape at a low tension during an unmount. Archive Mode Unthread reduces the physical stretching of the tape by detaching a magnetic recording component of the tape media from a reel of the tape drive (referred to as an "unthread operation"). However, the time required to reposition the tape when rewound at a low tension increases significantly.

Aspects of the present disclosure recognize the need to preserve Archive Mode Unthread functionality to prevent tape stretching while simultaneously reducing the time spent repositioning the tape medium (e.g., during an unmount). Because the Archive Mode Unthread functionality increases the time required to reposition the tape, solutions are needed to reduce the amount of repositioning that needs to occur during transitional operations within the tape system. Aspects of the present disclosure provide this solution.

Aspects of the present disclosure are directed to a method for managing index writes to a tape medium. A determination can be made whether a change was made to at least one file or directory stored within a tape medium while the tape medium was mounted within a tape drive. In response to determining that the change was made to at least one file or directory while the tape medium was mounted within the tape drive, an index can be written to a data partition of the tape medium. A determination can be made whether the change included any changes to a file or directory at or above (i.e., at least equal to) a threshold hierarchy level. In response to determining that the change did not include any changes to a file or directory at or above the threshold hierarchy level, a first instruction can be issued to the tape drive to reposition the tape medium to the end of the tape. A second instruction can be issued to the tape drive to perform an unthread operation at low tension to rewind the tape medium.

Referring now to the figures, FIG. 1 is a diagram illustrating an example tape medium format including an index partition (IP) and data partition (DP), in accordance with embodiments of the present disclosure. As illustrated in FIG. 1, the DP stores Index 1, File A, File B, Index 2, File C, and Index 3 in an order from the beginning of the physical tape medium to the end of the physical tape medium. The IP of the tape medium stores Index 3.

The indices (e.g., Index 1, Index 2, and Index 3) include information regarding the current volume of the data written to the tape medium. The indices can be used to verify the consistency of the tape medium volume. The index data can be stored in XML (Extensible Markup Language) format. Each index can contain a generation number, self-pointer, and back-pointer. The generation number records the age of each respective index relative to other indices in the volume. Accordingly, the index with the highest generation number represents the current state of the entire volume on the tape medium. The self-pointer includes data regarding the block position of each respective index in addition to the volume to which each index belongs. The back-pointer includes information regarding the position of the preceding index in the data partition. Accordingly, the information stored in each index can be used to locate indices, files, and blocks of data recorded on the tape medium.

In the embodiment depicted in FIG. 1, Index 1 is initially written, Index 2 is written after Files A and B are closed, and Index 3 is written after File C is closed. In accordance with LFTS, the indices can be written based on any suitable condition. For example, in some embodiments, the indices can be written periodically (e.g., every 5 minutes). In some embodiments, the indices can be written when each file closes (e.g., Index 2 and Index 3 are written in response to closing Files B and C, respectively). In some embodiments, the indices can be written in response to the tape medium being unmounted (e.g., each index depicted in FIG. 1 is written in response to an unmount operation). However, in some embodiments, combinations of the conventional index write conditions can be implemented. For example, Index 1 can be written based on a periodic index write, Index 2 can be written based on File B being closed, and Index 3 can be written in response to an unmount operation.

The most recent index, Index 3, is stored in the IP of the tape medium such that upon remounting the tape, Index 3 can be quickly located within the IP. This improves the remounting process (e.g., the tape being reeled to the latest position in the DP) within the tape system. Indices stored in index partition can be rewritten with the most recent index information when unmounting the tape. For example, if Index 2 was previously saved in the IP, then Index 2 can be rewritten with Index 3. However, Index 1 and Index 2 remain in the DP, as data is recorded in the DP in an appended manner.

An implementation of LTFS, IBM Spectrum™ Archive Single Drive Edition (SDE), is a file system that allows access to a tape using a single tape drive. IBM Spectrum™ Archive SDE offers operations like those for other removable media items (e.g., flash drives and DVDs).

Figures 2A, 2B:
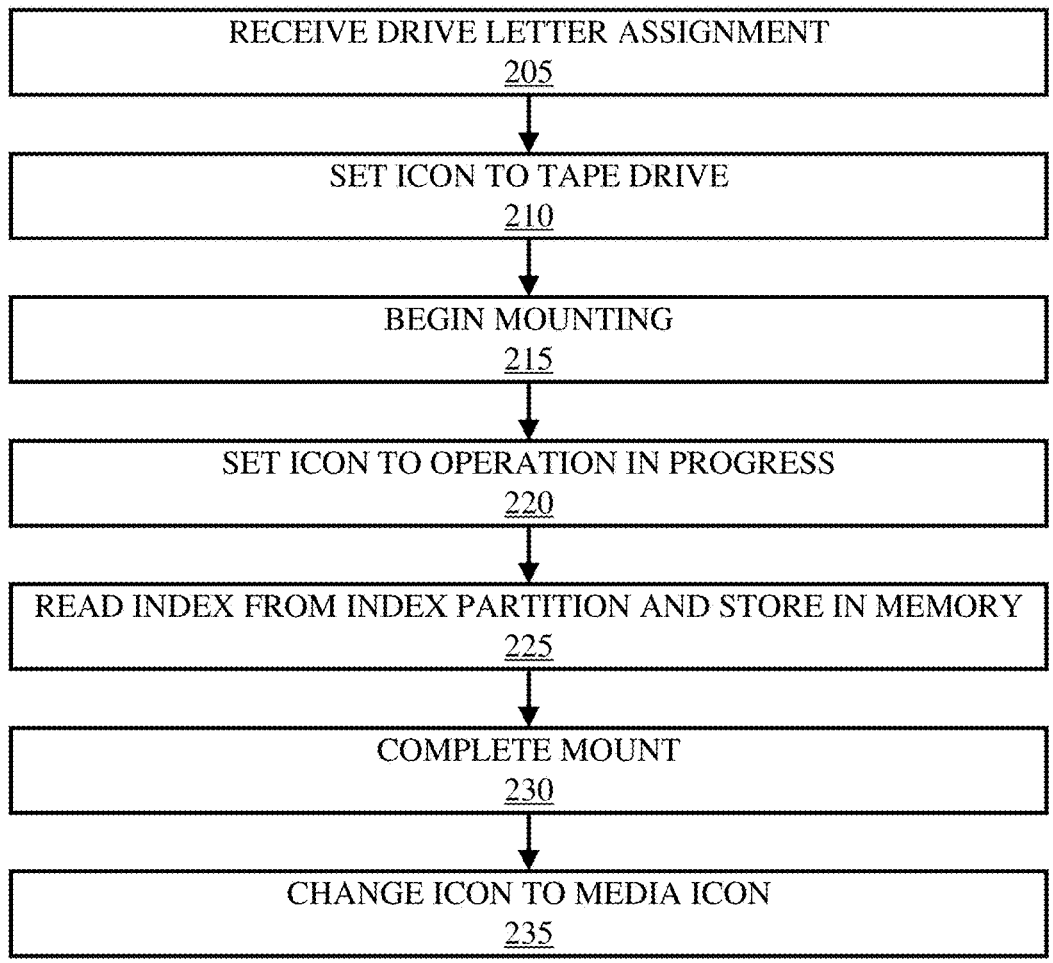
FIG. 2A is a diagram depicting a table of icons used in a linear tape file system (LTFS), in accordance with embodiments of the present disclosure.
FIG. 2B is a flow-diagram depicting a method for mounting a tape, in accordance with embodiments of the present disclosure.

Referring now to FIG. 2A, shown is an example table 200 depicting icons displayed to users accessing a LTFS (e.g., IBM Spectrum™ Archive SDE), in accordance with embodiments of the present disclosure. These icons include a "tape drive" icon that is displayed when a drive letter is assigned to a tape drive, an "operation in progress" icon that represents a state transition such as when a tape is being mounted or unmounted, and a "media" icon that represents that the tape has been mounted and indicates that users are allowed to access the files and directories therein.

Referring now to FIG. 2B, depicted is an example method 250 for mounting a tape within a tape drive (e.g., using IBM Spectrum™ Archive SDE), in accordance with embodiments of the present disclosure. Method 250 initiates at operation 205 where a drive letter assignment is received. An icon corresponding to the "tape drive" icon depicted in table 200 is then set. This is illustrated at operation 210. The tape is then inserted into the tape drive and mounting begins. This is illustrated at operation 215. The icon is then set (e.g., changed) to "operation in progress" depicted in table 200, indicating a state transition (a mounting in progress). This is illustrated at operation 220. An index is then read from the IP and stored in memory. This is illustrated at operation 225. Upon reading the index information, the mount operation completes. This is illustrated at operation 230. Upon mount, the icon is set to the "media" icon depicted in table 200. This is illustrated at operation 235. Users are then allowed to access the files and directories stored on the tape media.

When a user desires to unmount the tape, the user can "right click" the "media" icon and select "eject" to unload the tape from the tape drive. Such a process leads to an unmount operation.

Figure 3:
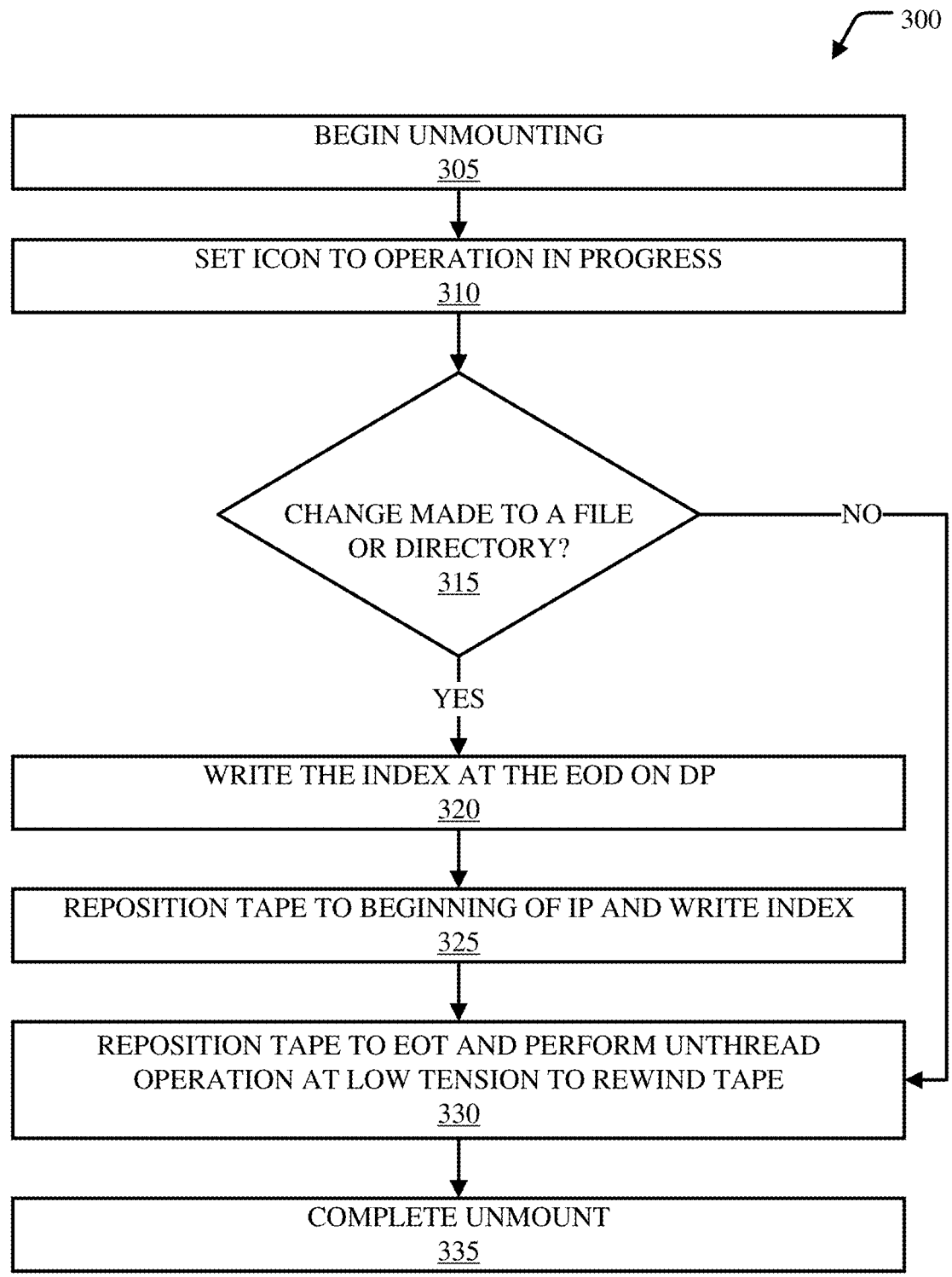
FIG. 3 is a flow-diagram depicting a method for unmounting a tape, the repositioning of the tape based on whether a change was made to a file or directory of the tape while the tape was mounted, in accordance with embodiments of the present disclosure.

Referring now to FIG. 3, shown is an example method 300 for unmounting a tape from a tape drive (e.g., using IBM Spectrum™ Archive SDE), in accordance with embodiments of the present disclosure. The unmount operation can be completed using the Archive Mode Unthread functionality discussed above.

At operation 305, unmounting begins. This can occur in response to a command issued by a user, in response to a particular amount of data being written to the tape, periodically, or based on any other suitable criteria. An icon is then changed to the "operation in progress" icon depicted in table 200. This is illustrated at operation 310. A determination is then made whether a change was made to a file or directory on the tape media while it was mounted (prior to the current unmount). This is illustrated at operation 315. This determination is made because indices are only required to be written to the IP and DP for recent updates. If no updates occur (e.g., the user only read information and did not perform any updates to the tape medium), then an index is not updated on the IP or DP. In embodiments, the determination whether a change was made to the tape media while the tape was mounted is determined by referencing a flag stored in memory. The flag can be activated (e.g., updated, set, triggered, etc.) in response to changes being made to the tape while the tape is mounted.

If a determination is made that a change was made to a file or directory on the tape while mounted (e.g., a flag was identified, triggered, or otherwise indicative of a change being made while the tape was mounted), then an index is written at the end of data (EOD) portion of the DP of the tape. This is illustrated at operation 320. After the index is written to the EOD portion of the DP of the tape, the tape is repositioned (e.g., in response to an instruction issued by a processor) to the beginning of the index and the index is written to the IP of the tape. This is illustrated at operation 325. Updating the index at the EOD region of the DP of the tape and updating the index at the beginning of the IP may only be necessary if a file or directory within the tape media is changed. Such index is written to reflect the update such that the current state of the tape medium is represented.

If a determination is made that a change was not made to a file or directory at operation 315 (e.g., no flag indicative of an update to the tape medium was identified), or after the tape is repositioned to the beginning of the IP and an index is written at operation 325, then the tape is repositioned to the end of the tape (EOT) and an unthread operation is performed at a low tension. This is illustrated at operation 330. The unthread operation can be performed as a functionality of Archive Mode Unthread mode being activated by a tape drive coupled with the tape medium. As such, the tape is wound to the beginning under low tension prior to unmount such that the tape is not physically stretched. Upon rewinding the tape under low tension, the unmount is completed. This is illustrated at operation 335.

The aforementioned operations can be completed in any order and are not limited to those described. Additionally, some, all, or none of the aforementioned operations can be completed, while still remaining within the spirit and scope of the present disclosure.

Though the risk of physically stretching the tape is reduced by using the unthread operation, the time required to rewind the tape medium increases. As such, embodiments of the present disclosure include a method for bypassing the amount of repositioning that needs to be performed, thereby reducing the amount of time required to perform transitional operations (e.g., an unmount operation) within the tape system. Such method utilizes the concept that indices need not be updated in the IP for changes made to files below a threshold hierarchy level (e.g., from the root level to a particular hierarchy level, for example, the $5^{th}$ hierarchy). If changes are only made to files below the threshold hierarchy value, the index is not stored in the IP, and as such, the amount of repositioning required for the tape medium prior to unmount is reduced.

Unmounting with the Archive Mode Unthread operation when a change is made to a file or directory can include:
1. Storing an index at the EOD region of the DP;
2. Repositioning the tape to the beginning of the IP and storing the index;
3. Repositioning the tape to the EOT; and
4. Performing an unthread operation at low tension to rewind the tape to the beginning prior to unmount.

This unmount repositioning procedure is depicted in method 300, FIG. 3.

Unmounting with the Archive Mode Unthread operation when changes are made only to files and/or directories below the threshold hierarchy level can include:
1. Storing an index at the EOD region of the DP;
2. Repositioning the tape to the EOT; and
3. Performing an unthread operation at low tension to rewind the tape to the beginning prior to unmount.

As such, the step of "repositioning the tape to the beginning of the IP and storing the index" can be bypassed if changes are only made to files or directories below the threshold hierarchy level. This unmount procedure is depicted in method 400, FIG. 4.

Figure 4:
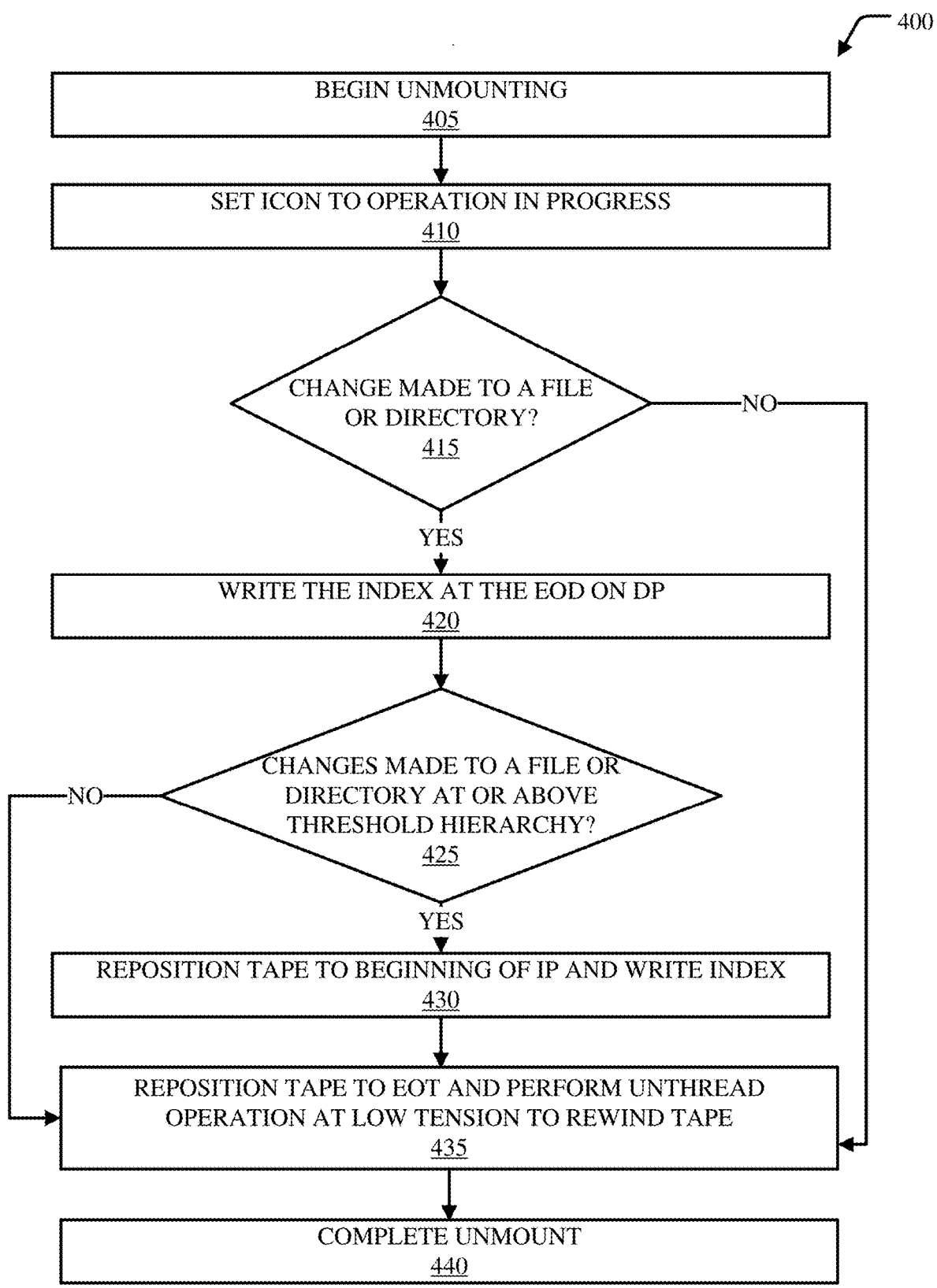
FIG. 4 is a flow-diagram depicting a method for unmounting a tape, the repositioning of the tape based on whether changes were made to the tape medium while the tape was mounted and the hierarchy level of such changes, in accordance with embodiments of the present disclosure.

FIG. 4 is a flow-diagram depicting a method for unmounting a tape, the repositioning of the tape based on whether changes were made to the tape medium while the tape was mounted and the hierarchy level of such changes, in accordance with embodiments of the present disclosure.

Method 400 initiates at operation 405, where an unmount operation is initiated. The unmount operation can be initiated in the same, or a substantially similar manner, as the unmount operation described with respect to operation 305 of FIG. 3. An icon is then set to "operation in progress" depicted in table 200. This is illustrated at operation 410. A determination is made whether a change was made to a file or directory while the tape was mounted. This is illustrated at operation 415. The determination can be completed substantially similar to operation 315 of FIG. 3. For example, the determination whether a change was made to a file or directory while the tape was mounted can be completed by referencing a flag set in response to a change being made.

If a determination is made that no changes were made to any files or directories while the tape was mounted, then method 400 proceeds to operation 435, where the tape is repositioned to the EOT and an unthread operation is performed at low tension to rewind the tape to the beginning prior to unmount. As such, if no files or directories were modified while the tape was mounted, then no indices are required to be updated.

If a determination is made that changes were made to any files or directories while the tape was mounted, then the index is written to the EOD region of the DP. This is illustrated at operation 420. In embodiments, independent of the hierarchy level, the index can always be written to the DP. This is completed because the tape position for writing is already at the EOD region of the DP, as data is written to the tape medium in an appended manner. As such, writing the index to the DP does not drastically impact performance (e.g., speed for unmount). This also provides the benefit of representing the current state of the data on the tape medium within the DP.

Upon writing the index to the EOD portion of the DP, a determination is made whether any changes were made to a file or directory at or above a threshold hierarchy level. This is illustrated at operation 425. As previously mentioned, changes made to files or directories below the threshold hierarchy level may not require an index to be stored within the IP of the tape medium. As such, repositioning associated with writing the index to the IP can be avoided for files or directories below the threshold hierarchy level (e.g., from root level to one level below the threshold hierarchy). In embodiments, a flag indicative of a change made to a file or directory at or above a threshold hierarchy can be set and triggered in response to observing a change made to a file or directory at or above the threshold hierarchy. The threshold hierarchy can, in some embodiments, be manually defined by a user. In some embodiments, a query prompting a user to set the threshold hierarchy level is transmitted during launch of the LTFS. The set threshold hierarchy level can depend on the use case of the user. For example, in some embodiments, the hierarchy can be a small integer (e.g., 2-5). In some embodiments, the hierarchy can be large integer (e.g., greater than 5).

If a determination is made that a change is made to a file or directory at or above the threshold hierarchy, then the tape is repositioned to the beginning of the IP and an index is written to the IP. This is illustrated at operation 430. Upon writing the index at operation 430, the tape is repositioned to the end of the tape and an unthread operation is performed at low tension to rewind the tape to the beginning of the tape prior to unmount. This is illustrated at operation 435. The unmount procedure is then completed at operation 440.

If a determination is made that no changes were made to any files or directories at or above the threshold hierarchy (e.g., changes were only made to files or directories from a root level to a hierarchy level below the threshold hierarchy), then the tape is repositioned to the end of the tape and an unthread operation is performed to rewind the tape at low tension prior to unmount at operation 435. As such, if no changes are made to files or directories at or above the threshold hierarchy, operation 430 is bypassed, removing the need to reposition the tape to the beginning of the IP to write and index. The unmount procedure is then completed at operation 440.

The aforementioned operations can be completed in any order and are not limited to those described. Additionally, some, all, or none of the aforementioned operations can be completed, while still remaining within the spirit and scope of the present disclosure.

Figure 5:
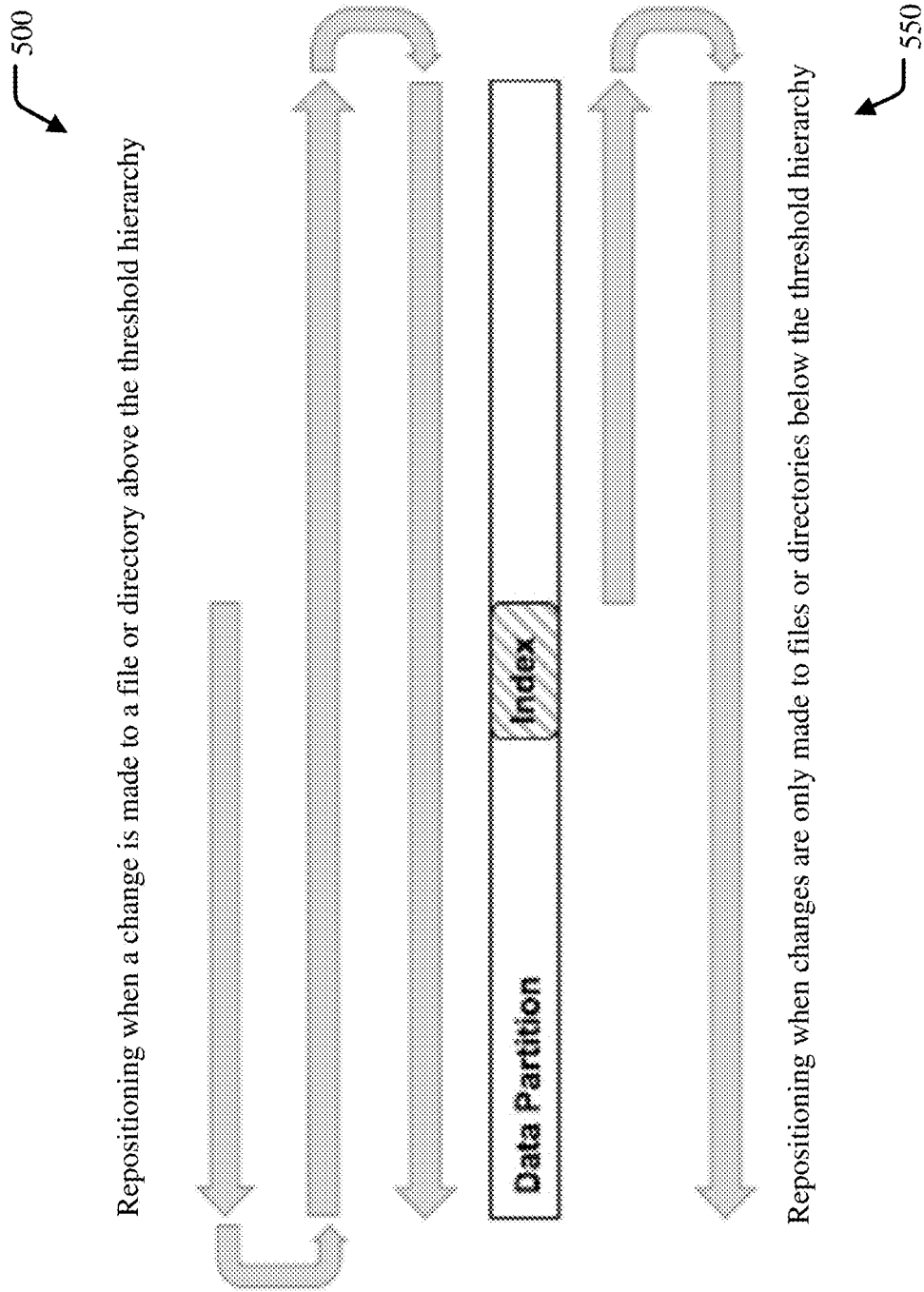
FIG. 5 is a diagram depicting a comparison between two techniques for repositioning a tape during an unmount, in accordance with embodiments of the present disclosure.

Referring now to FIG. 5, shown is a diagram depicting a comparison between repositioning that occurs when a change is made to a file or directory at or above a threshold hierarchy level and repositioning that occurs when changes are only made to files or directories below the threshold hierarchy, in accordance with embodiments of the present disclosure.

As shown in FIG. 5, repositioning 500 when a change is made to a file or directory at or above the threshold hierarchy level (or alternatively, if a threshold hierarchy level is not applied) includes first writing an index to an EOD region of the DP. Thereafter, the tape is repositioned to the beginning of the IP and an index is written to the IP. The tape is then repositioned to the end of the tape and rewound to the beginning of the tape using an unthread operation at low tension prior to unmounting.

Repositioning 550 when changes are only made to files or directories below the threshold hierarchy level includes first writing an index to the EOD region of the DP. Thereafter, the tape can be repositioned to the end of the tape and rewound to the beginning of the tape using the unthread operation at low tension prior to unmounting. As such, the time spent repositioning to the tape to the IP to write an index and then to the back of the tape can be avoided.

When an index is not written to the IP because changes are only made to files or directories below the threshold hierarchy value, in order to access the files and/or directories below the threshold hierarchy value, the index in the DP must be referenced. However, the index stored in the IP is still usable for files and/or directories at or above the threshold hierarchy value. As such, aspects of the present disclosure include a method for mounting a tape and accepting access requests based on hierarchy level, depicted in FIG. 6.

Figure 6:
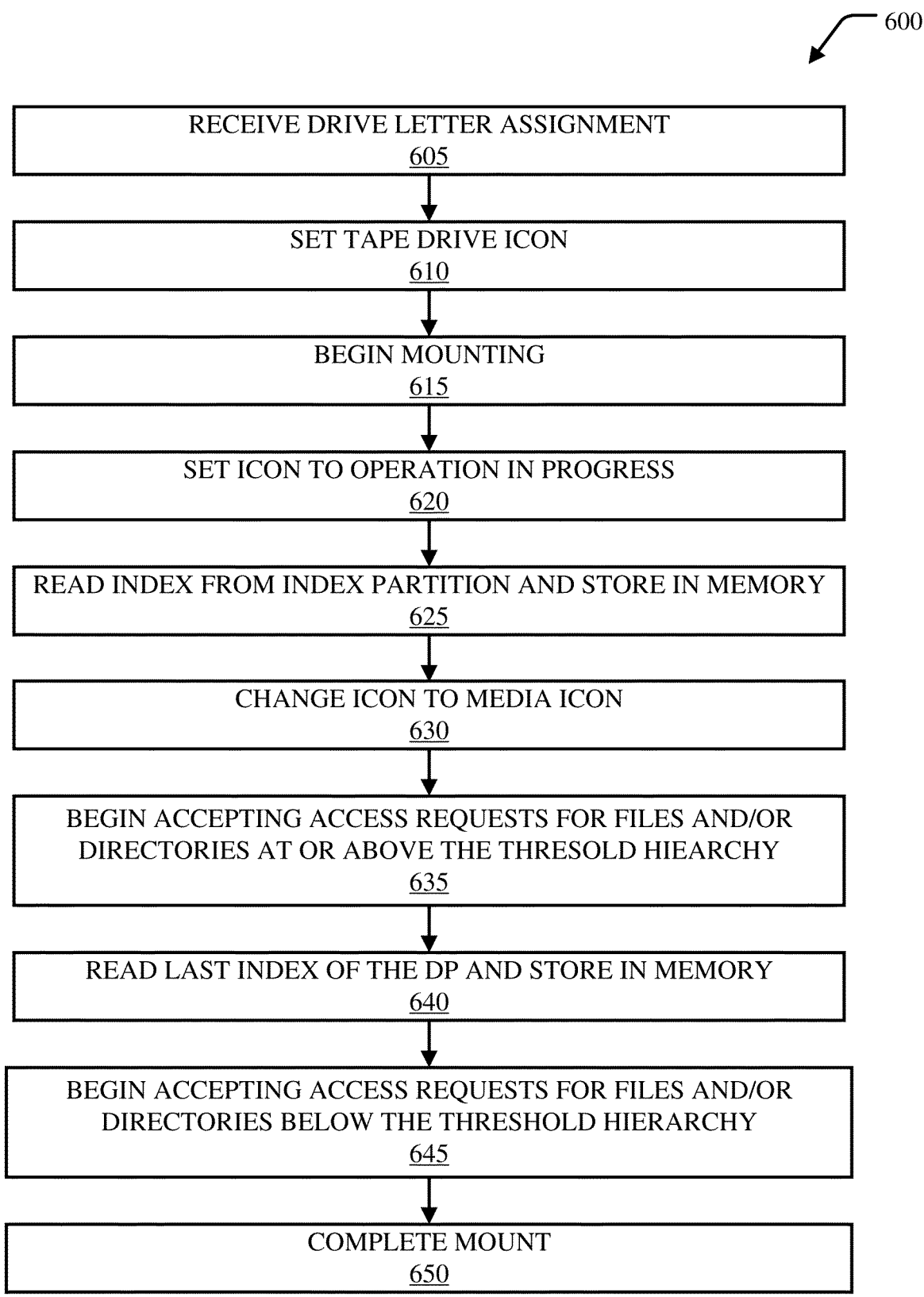
FIG. 6 is a flow-diagram depicting a method for mounting a tape and accepting access requests based on hierarchy level, in accordance with embodiments of the present disclosure.

Referring now to FIG. 6, shown is an example method 600 for mounting a tape and accepting access requests based on hierarchy level, in accordance with embodiments of the present disclosure.

Method 600 initiates at operation 605, where a drive letter assignment is received. An icon is then set to the "tape drive" icon depicted in table 200. This is illustrated at operation 610. Mounting is then initiated at operation 615. The icon is then changed to the "operation in progress" icon depicted in table 200. This is illustrated at operations 620. An index is then read from the index partition and stored in memory. This is illustrated at operation 625. The icon is then set to the "media" icon. This is illustrated at operation 630. Access requests are then accepted for files and/or directories at or above the threshold hierarchy. This is illustrated at operation 635. Access requests can be accepted for files and/or directories at or above the threshold hierarchy because the index read from the IP and stored in memory represents the state of such files and/or directories.

The last index of the DP at the EOD on the tape is then read and stored in memory. This is illustrated at operation 640. Access requests are then accepted for files and/or directories below the threshold hierarchy level. This is illustrated at operation 645. Access requests can be accepted for files and/or directories below the threshold hierarchy level because the index read from the DP at the EOD on the tape represents the state of such files and/or directories. The mount operation then completes at operation 650.

The aforementioned operations can be completed in any order and are not limited to those described. Additionally, some, all, or none of the aforementioned operations can be completed, while still remaining within the spirit and scope of the present disclosure.

Figure 7:
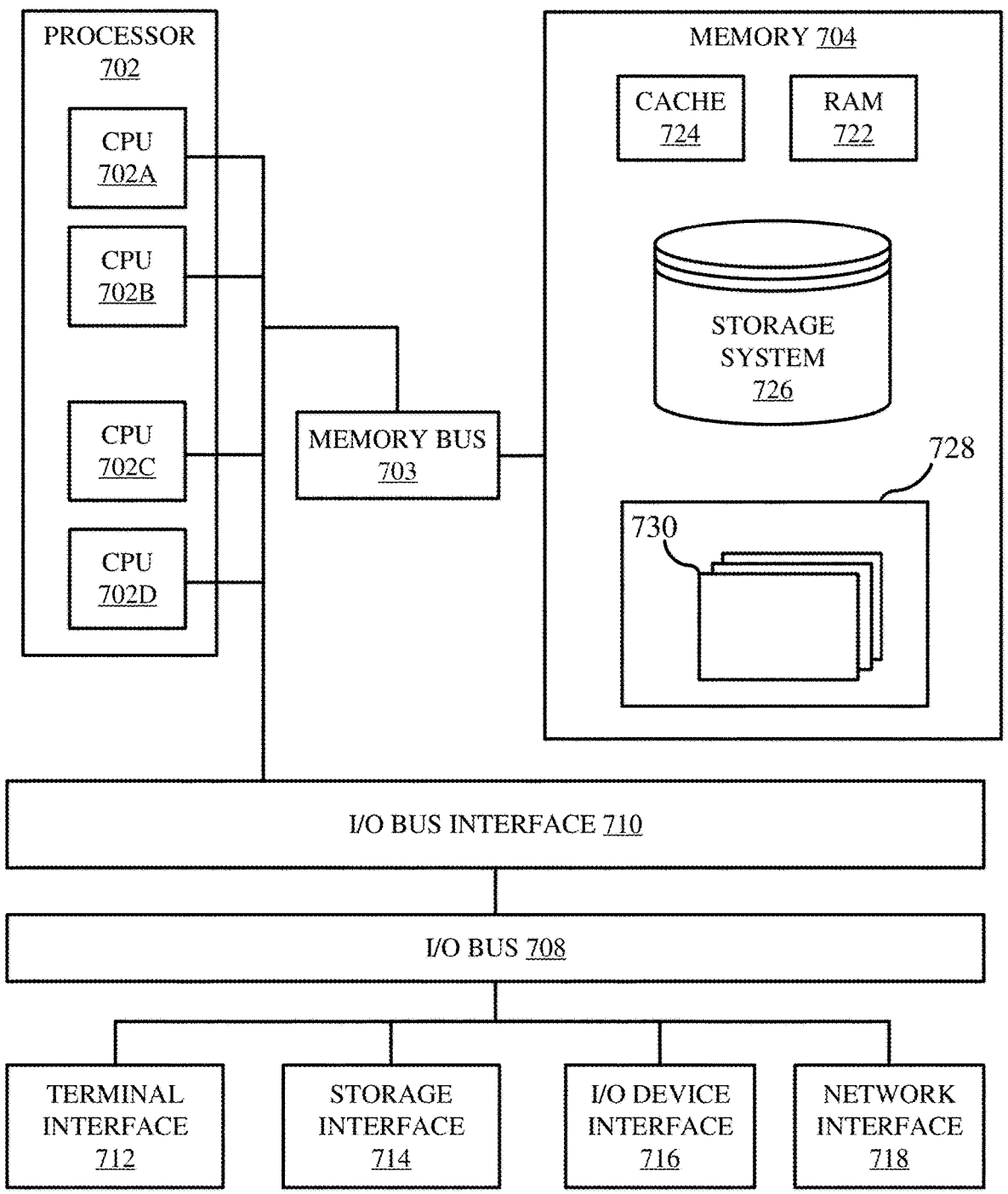
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., a computer system communicatively coupled to the linear tape file system (LTFS)) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 701 can comprise one or more CPUs 702, a memory subsystem 704, a terminal interface 712, a storage interface 714, an I/O (Input/Output) device interface 716, and a network interface 718, all of which can be communicatively coupled, directly or indirectly, for inter-component communication via a memory bus 703, an I/O bus 708, and an I/O bus interface unit 710.

The computer system 701 can contain one or more general-purpose programmable central processing units (CPUs) 702A, 702B, 702C, and 702D, herein generically referred to as the CPU 702. In some embodiments, the computer system 701 can contain multiple processors typical of a relatively large system; however, in other embodiments the computer system 701 can alternatively be a single CPU system. Each CPU 702 can execute instructions stored in the memory subsystem 704 and can include one or more levels of on-board cache.

System memory 704 can include computer system readable media in the form of volatile memory, such as random access memory (RAM) 722 or cache memory 724. Computer system 701 can further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. In embodiments, memory 704 can include a magnetic tape system. For example, the computer system 701 may be communicatively coupled to a linear tape file system (LTFS). Memory devices can be connected to memory bus 703 by one or more data media interfaces. The memory 704 can include at least one program product having a set (e.g., at least one) of program modules that are configured to carry out the functions of various embodiments.

One or more programs/utilities 728, each having at least one set of program modules 730 can be stored in memory 704. The programs/utilities 728 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 can, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices can be connected directly to one or more system I/O buses.

In some embodiments, the computer system 701 can be a multi-user mainframe computer system, a single-user system, or a server computer or similar device that has little or no direct user interface, but receives requests from other computer systems (clients). Further, in some embodiments, the computer system 701 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components can have greater or lesser complexity than as represented in FIG. 7, components other than or in addition to those shown in FIG. 7 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   determining, by a processor, whether a change was made to at least one file stored within a tape medium while the tape medium was mounted within a tape drive;

writing, by the processor, in response to determining that the change was made to the at least one file while the tape medium was mounted within the tape drive, an index to a data partition of the tape medium;

determining, by the processor, whether the change included any changes at least equal to a threshold hierarchy level;

issuing, by the processor, a first instruction to the tape drive, in response to determining that the change did not include any changes at least equal to the threshold hierarchy level, to reposition the tape medium to an end of the tape; and issuing, by the processor, a second instruction to the tape drive to perform an unthread operation at low tension to rewind the tape medium.

2. The method of claim 1, wherein determining whether the change was made to the at least one file stored within the tape medium while the tape medium was mounted within a tape drive includes:

identifying a flag stored in memory indicative of the change being made.

3. The method of claim 1, further comprising:

determining whether a second change was made to at least one file stored within the tape medium while the tape medium was mounted within the tape drive a second time;

issuing a third instruction to the tape drive, in response to determining that the second change was made to the at least one file stored within the tape medium while the tape medium was mounted within the tape drive the second time, to reposition the tape medium to the end of the tape; and issuing a fourth instruction to the tape drive to perform the unthread operation at low tension to rewind the tape medium.

4. The method of claim 1, further comprising:

receiving an indication of a mount;

reading an index stored within an index partition of the tape medium; and accepting requests for files at least equal to the threshold hierarchy level.

5. The method of claim 4, further comprising:

reading the index stored within the data partition of the tape medium; and accepting requests for files below the threshold hierarchy level.

6. The method of claim 1, further comprising:

determining whether a second change was made to at least one file stored within the tape medium while the tape medium was mounted within the tape drive a second time;

writing, in response to determining that the second change was made to at least one file while the tape medium was mounted within the tape drive the second time, an index to a data partition of the tape medium;

determining whether the change included any changes at least equal to the threshold hierarchy level;

issuing a third instruction to the tape drive, in response to determining that the change did include changes at least equal to the threshold hierarchy level, to reposition the tape medium to a beginning of an index partition of the tape medium; and writing a second index to the index partition.

7. The method of claim 6, further comprising:

issuing a fourth instruction to the tape drive, in response to writing the second index, to reposition the tape medium to the end of the tape; and issuing a fifth instruction to the tape drive to perform the unthread operation at low tension to rewind the tape medium.

8. The method of claim 1, wherein determining whether the change included any changes at least equal to the threshold hierarchy level includes:

identifying a flag stored in memory indicative of a change being made to a file at least equal to the threshold hierarchy level.

9. The method of claim 1, wherein the threshold hierarchy level is defined by a user upon launching a linear tape file system (LTFS) application associated with the tape medium.

10. A system comprising:

a tape system having a tape medium and a tape drive; and a processor communicatively coupled to the tape system configured to perform a method comprising:

determining whether a change was made to at least one file stored within the tape medium while the tape medium was mounted within the tape drive;

writing, in response to determining that the change was made to the at least one file while the tape medium was mounted within the tape drive, an index to a data partition of the tape medium;

determining whether the change included any changes at least equal to a threshold hierarchy level;

issuing a first instruction to the tape drive, in response to determining that the change did not include any changes at least equal to the threshold hierarchy level, to reposition the tape medium to an end of the tape; and issuing a second instruction to the tape drive to perform an unthread operation at low tension to rewind the tape medium.

11. The system of claim 10, wherein determining whether the change was made to the at least one file stored within the tape medium while the tape medium was mounted within a tape drive includes:

identifying a flag stored in memory indicative of the change being made.

12. The system of claim 10, wherein the method performed by the processor further comprises:

determining whether a second change was made to at least one file stored within the tape medium while the tape medium was mounted within the tape drive a second time;

issuing a third instruction to the tape drive, in response to determining that the second change was made to the at least one file stored within the tape medium while the tape medium was mounted within the tape drive the second time, to reposition the tape medium to the end of the tape; and issuing a fourth instruction to the tape drive to perform the unthread operation at low tension to rewind the tape medium.

13. The system of claim 10, wherein the method performed by the processor further comprises:

receiving an indication of a mount;

reading an index stored within an index partition of the tape medium; and accepting requests for files at least equal to the threshold hierarchy level.

14. The system of claim 13, wherein the method performed by the processor further comprises:

reading the index stored within the data partition of the tape medium; and accepting requests for files below the threshold hierarchy level.

15. The system of claim 10, wherein the method performed by the processor further comprises:
- determining whether a second change was made to at least one file stored within the tape medium while the tape medium was mounted within the tape drive a second time;
- writing, in response to determining that the second change was made to at least one file while the tape medium was mounted within the tape drive the second time, an index to a data partition of the tape medium;
- determining whether the change included any changes at least equal to the threshold hierarchy level;
- issuing a third instruction to the tape drive, in response to determining that the change did include changes at least equal to the threshold hierarchy level, to reposition the tape medium to a beginning of an index partition of the tape medium; and
- writing a second index to the index partition.

16. The system of claim 15, wherein the method performed by the processor further comprises:
- issuing a fourth instruction to the tape drive, in response to writing the second index, to reposition the tape medium to the end of the tape; and
- issuing a fifth instruction to the tape drive to perform the unthread operation at low tension to rewind the tape medium.

17. A computer program product comprising a computer readable storage medium having program instructions embodied therewith, the program instructions executable by a processor to cause the processor to perform a method comprising:
- determining whether a change was made to at least one file stored within a tape medium while the tape medium was mounted within a tape drive;
- writing, in response to determining that the change was made to at least one file while the tape medium was mounted within the tape drive, an index to a data partition of the tape medium;
- determining whether the change included any changes at least equal to a threshold hierarchy level;
- issuing a first instruction to the tape drive, in response to determining that the change did not include any changes at least equal to the threshold hierarchy level, to reposition the tape medium to an end of the tape; and
- issuing a second instruction to the tape drive to perform an unthread operation at low tension to rewind the tape medium.

18. The computer program product of claim 17, wherein determining whether the change included any changes at least equal to a threshold hierarchy level includes:
- identifying a flag stored in memory indicative of a change being made to a file at least equal to the threshold hierarchy level.

19. The computer program product of claim 17, wherein the method performed by the processor further comprises:
- receiving an indication of a mount;
- reading an index stored within an index partition of the tape medium; and
- accepting requests for files at least equal to the threshold hierarchy level.

20. The computer program product of claim 17, wherein the method performed by the processor further comprises:
- reading the index stored within the data partition of the tape medium; and
- accepting requests for files below the threshold hierarchy level.

* * * * *